US012699800B2

(12) United States Patent
Nijasure et al.

(10) Patent No.: US 12,699,800 B2
(45) Date of Patent: Aug. 4, 2026

(54) ENCRYPTED FILE SEARCH

(71) Applicant: Keyavi Data Corp., Durango, CO (US)

(72) Inventors: Prashant Nijasure, Durango, CO (US); Shai Guday, Durango, CO (US); Elliot Daniel Lewis, Durango, CO (US)

( * ) Notice: Subject to any disclaimer, the term of this patent is extended or adjusted under 35 U.S.C. 154(b) by 0 days.

(21) Appl. No.: 18/733,615

(22) Filed: Jun. 4, 2024

(65) Prior Publication Data

US 2025/0371189 A1 Dec. 4, 2025

(51) Int. Cl.
| | |
|---|---|
| *G06F 21/62* | (2013.01) |
| *G06F 21/60* | (2013.01) |
| *G06F 40/279* | (2020.01) |

(52) U.S. Cl.
CPC ........ *G06F 21/6227* (2013.01); *G06F 21/602* (2013.01); *G06F 40/279* (2020.01); *G06F 2221/2107* (2013.01); *G06F 2221/2113* (2013.01); *G06F 2221/2141* (2013.01)

(58) Field of Classification Search
CPC .. G06F 21/6227; G06F 21/602; G06F 40/279; G06F 2221/2107; G06F 2221/2113; G06F 2221/2141
See application file for complete search history.

(56) References Cited

U.S. PATENT DOCUMENTS

| | | | |
|---|---|---|---|
| 9,558,363 B2 * | 1/2017 | Whalley | ............. G06F 21/6209 |
| 2011/0004607 A1 * | 1/2011 | Lokam | .................. G06F 16/328 |
| | | | 707/769 |
| 2019/0050398 A1 * | 2/2019 | Li | ............................. H04L 9/30 |
| 2020/0125563 A1 * | 4/2020 | Fan | ........................ H04L 9/0894 |
| 2025/0005359 A1 * | 1/2025 | Yang | ........................ G06N 3/08 |

* cited by examiner

*Primary Examiner* — Mohammad W Reza
(74) *Attorney, Agent, or Firm* — Ferguson Braswell Fraser Kubasta PC

(57) ABSTRACT
A method, computer program product, and system are provided for managing encrypted files. A file is received, wherein the file comprises file metadata. A large language model identifies keywords from the file, and generates keyword vector(s) from the identified keywords. The file is encrypted and indexed with the keyword vector(s) and the file metadata in a protected index.

20 Claims, 5 Drawing Sheets

Computing
System
500

508
Output Device(s)

504
Non-Persistent
Storage

502
Computer
Processor(s)

506
Persistent
Storage

512
Communication
Interface

510
Input Device(s)

520
Network

522
Node X

O O O

524
Node Y

526
Client Device

ENCRYPTED FILE SEARCH

BACKGROUND

The proliferation of data across various platforms has necessitated robust security measures to protect sensitive information from unauthorized access. Traditional encryption technologies safeguard data by rendering it unreadable to anyone who does not possess the requisite decryption keys. However, while encryption effectively secures data against external threats, it also introduces significant challenges, particularly concerning the accessibility and usability of the encrypted data. For instance, once a file is encrypted, its contents—including metadata and other contextual information—are typically obscured, making it difficult to search for and retrieve these files efficiently using conventional search techniques.

Current search methodologies often require decrypting the data before it can be searched, which not only compromises the security of the information but also demands substantial computational resources and time. Moreover, these processes can be cumbersome and prone to errors, particularly when managing large volumes of data across distributed storage solution. As a result, users often face trade-offs between maintaining high security standards and achieving operational efficiency, particularly where data sensitivity and quick access are equally paramount.

SUMMARY

Aspects of the invention relate to a method, computer program product, and system for managing encrypted files. In an embodiment, a method receives a file, wherein the file comprises file metadata. A large language model identifies keywords from the file, and generates keyword vector(s) from the identified keywords. The file is encrypted and indexed with the keyword vector(s) and the file metadata in a protected index.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Figure 1A:
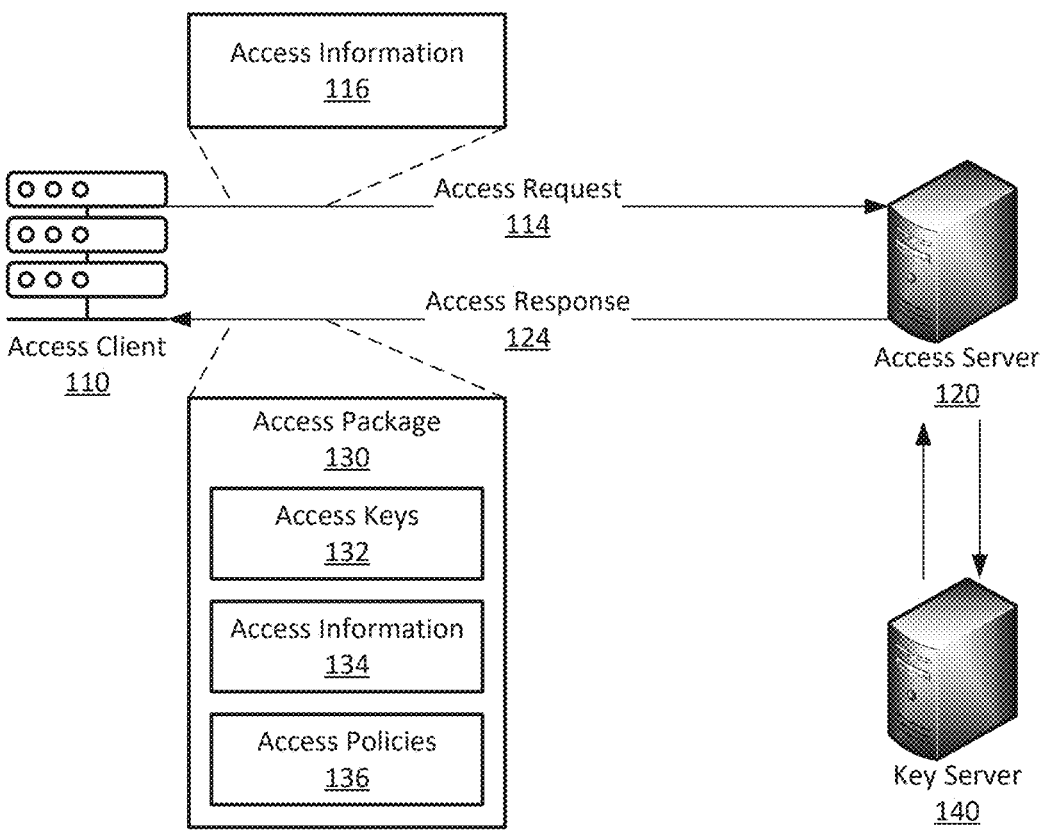
FIG. 1A shows a computing architecture in accordance with one or more illustrative embodiments.

FIG. 1A shows a computing architecture (100) that supports encrypted file control in accordance with illustrative embodiments. The computing architecture (100) includes an access client (110) and an access server (120).

The access client (110) receive encrypted files from other access devices, interact with the access server (120) to generate and access encrypted files, present information decrypted from the encrypted files, and establish connections and update data. The access client (110) may be configured to execute on an access device to support the file control techniques described herein.

The access device on which the access client (110) executes may be an example of computing systems in accordance with those described in FIG. 5 and, for example, may be smartphones, laptop computers, tablets, desktop computers, and the like. The access device may interact with other access devices, mobile devices, and the access server (120) using wired or wireless communication techniques.

The access client (110) may encrypt and/or decrypt files or portions of files according to the techniques described herein. In some cases, the user is required to login to the access client daily, periodically, etc. Logging in to the access client (110) may trigger a communication with the access server (120) including establishing a secure connection. Additionally, a token may be generated at login, and the token may be used for secure communications with the access server (120). In some examples, the user may register a geographic location, network identifier, etc. at login, and such information is used for token generation, secure communications with the server, file access policy enforcement (e.g., data geo-fencing), etc.

In an example use of the access client (110), user may use the access client (110) to secure a file or portion of a file. The user may select the file and then select file access policies for the file via the access client (110). After selection of the file and the file access policies, the access client (110) may send an access request (114) to the access server (120). In the case of an encryption request, the access server (120) may be identified based on a URL (e.g., an API endpoint) configured at the access client (110). The access request (114) may include access information (116), as well as file information associated with the file (file size, type, file metadata). The access information (116) may be customized based on the access client (110). Depending on the implementation (e.g., organization configurations, personal configurations) of the access client (110), the access information may include various information, such as internet protocol (IP) address, network information, motherboard identifier, universally unique (UU) identifier, user identifiers, client identifiers (e.g., client license identifier), client version, geo-location information, browser information (e.g., in case of a browser based client), application information (e.g., in case of a client plug-in). The access information (116) may also include an access token.

The access information (116) may include information about the user, the computing system of the user, the location of the computing system, and the type of access being requested. Information about the user may include a username, user access tokens, a digital signature of the user, a public key of user, etc. Information about the computing system of the user may include hardware and software identifiers of the hardware and software components of the computing system. Information about the location of the computer system may include an IP address for the computer system, which may be mapped to a geographic location. The access information (116) may be part of a header of the access request (114) and may be formatted in accordance with the JavaScript object notation (JSON) standard.

The access information (116), the access request (114), or another communication from the access client (110) may also include indications of file access policies for the file to be encrypted. Thus, the selected policies, including read, write, collaborate, geo-restriction policies, authorized users, and other policies may be communicated to the access server (120). The access server (120) may maintain a record of the file information and access policies in a secure repository.

The access server (120) interacts with the other components of the architecture (100) to control access to encrypted files. The access server (120) is a set of programs that provides access responses to access requests from the access client (110) and may be managed by a services provider. The access server (120) may execute on a computing system in accordance with those described in FIG. 5 and, for example, may be one of multiple servers in one or more cloud environments that host the server application (122).

The access server (120) receives access requests (114) from the access client (110) for encrypted files. The access server (120) authorizes the access requests using several types of information, including user credentials (e.g., user identifier, email address, access token, etc.), access device location information, mobile device location information, user privileges information, file access permissions, etc.

The access server (120) may validate the access information (116). Validations may include validating locations, validating networks, validating the device, validating the token (e.g., token is active), and other information. In some cases, an organization may be associated with organization policies that indication certain information is to be present in order to use the encrypt function. For example, a global policy may indicate that employees or users may only be able to encrypt a file when present at the office. As such, various validations are used to ensure organizational policies are satisfied. The validations are customizable for various considerations and scenarios.

If the access requests (114) is validated, the access information (116) may be stored as described herein, and the access server (120) may generate an access package (130). In order to generate the access package (130), the access server (120) may call (e.g., transmit a request to) a secure key server (140) to generate encryption keys using a key service. The key server (140) may be an example of a third-party key management service. The secure key store may return a random string that is used to generate the keys. The access server (120) may be configured to split the string into one or more access keys (132), and as such, the secure key store may not be able to identify the access keys (132). In some examples, the request to the key store may include file identification information that may be used in subsequent decryption request to receive the key string. Each encryption request may result in a separate set of keys.

The access server (120) may also generate access information (134) for the access package (130). The access information (134) may include code (e.g., executable code) from various types of encryption or decryption libraries. As such, the encryption/decryption schemes and keys may be customizable depending on the desires of the organization implementing the techniques described herein. The access information (134) may include instructions for encrypting the file including the payload and data packs. In some cases, the access package (130) may include the indication of the file access policies (136) and/or ownership information such that the policies and ownership information may be encrypted with the file. The access information (134) may be retrieved from an instruction repository configured for each tenant or organization that implements the system described herein, and as such, may use the access server (120) generates access responses (124) based on the authorization of the access requests (114). The server application (122)

generates access packages (130) included within the access responses (124) that are returned to the access client (110). Access packages (130) include source code that has been injected with information, including keys from one or more of the key servers (140).

As described herein, the access package may be an encryptor package, decryptor package, decoy package, or terminate package. The encryptor package may include source code with functions to encrypt data but does not include source code with functions to decrypt data. The decryptor package may include source code with functions to decrypt data but not for encrypting data. The terminate package may include source code with functions to hide or remove encrypted files. The decoy package may include source code with functions to display data that looks similar to data from an encrypted file, but which does not include data from the encrypted file. The terminate package and the decoy package may not include source code, keys, or salts used to encrypt or decrypt data.

In some cases, the access information (134) may include values or data payloads which is used to transform the data of the payload/file into another form, or is used to apply operations to change values within the data, or both. In some examples, the data transformation instructions may be indicated in the Access packages (130) or may be configured at the access client (110). As such, when the access information (134) includes the values or data payloads, the access information (134) (and the access package (130)) may not include compliable or executable code.

The access package (130) is transmitted to the access client (110) in an access response (124). The access client (110) may compile the access information (134) to generate machine executable code that is used to perform the operations (e.g., encrypt, decrypt, enforce policies). The access client (110) is configured to use the access information (134) in order to generate the encrypted file (e.g., using access keys (132)). Using the access information may include executing the code included in the access information (134) that causes instantiation and encryption of the data packs, encryption of the payload (e.g., file to be encrypted), and encryption of the data packs and the file together. As such, depending on the configuration, there may be multiple layers of encryption in the encrypted file. The encrypted file may then be transmitted to various other users and devices using file transfer or communication techniques.

If the access request (114) is a decryption request, then similar techniques may be used. Similar access information (116) may be communicated to the access server (120). The access server (120) may perform various validations. The validations for decryption may be different than the encryption validations. For example, the access server (120) may determine whether the user and/or device requesting decryption are authorized to access the file based on the information stored in association with the file identifier. In some cases, the validation includes determining that the location of the requesting access device satisfies a location policy (geo-location, network location).

To execute the access information (134), the access client (110) may instantiate an object associated with the code in memory and use the access keys (132) to encrypt or decrypt the file. After the file is successfully encrypted or decrypted, the code is destroyed (e.g., removed from memory). Thus, the object is sustained in the memory of the access device at run-time and removed after execution. Thus, the access client (110) is configured only to execute the code and is not configured (without the code) to encrypt or decrypt the files.

Figure 1B:
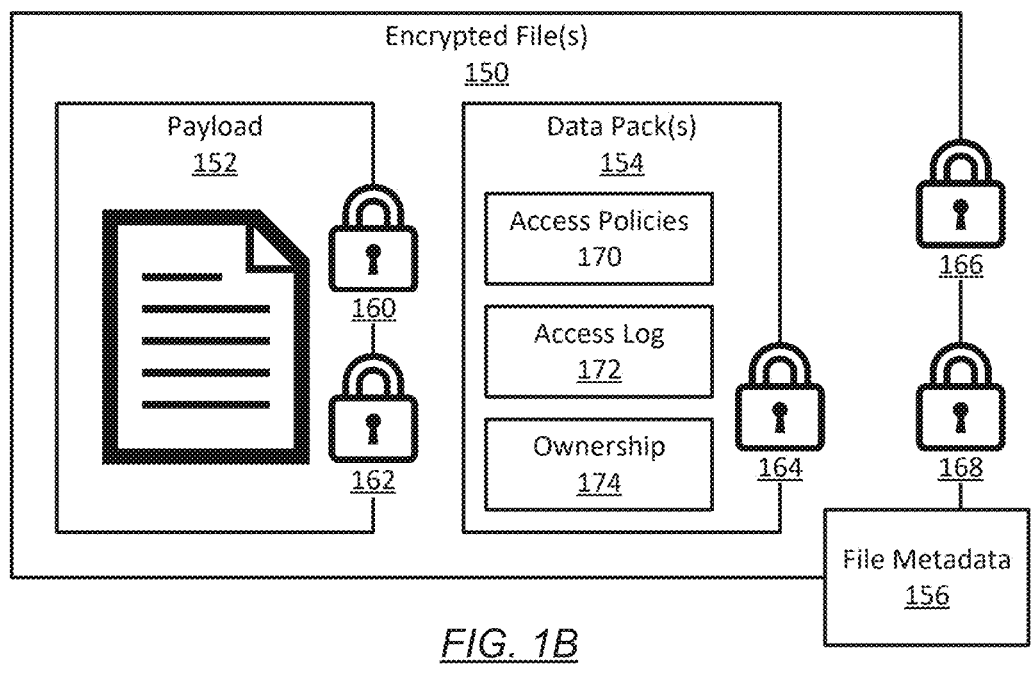
FIG. 1B illustrates an example of an encrypted file in accordance with illustrative embodiments.

FIG. 1B illustrates an example of an encrypted file(s) (150) that supports encrypted file control in accordance with aspects of the present disclosure. The encrypted file(s) (150) uses multiple salts and keys (which are not stored in the encrypted file(s) (150)) to control access to the payload (152) and protect the payload (152) from unauthorized access. The encrypted file(s) (150) includes the payload (152), the data packs (154), and the metadata (156).

The payload (152) is an electronic file that forms the basis of the encrypted file(s) (150). The payload (152) may include any type of electronic file, including text documents, spreadsheets, slide presentations, source code files, image files, archive files, video files, etc. The encrypted file(s) (150) may include a single file within the payload (152).

The payload (152) may be salted with the payload salt (160) and encrypted with the payload key (162) prior to being inserted into the encrypted file(s) (150). In some implementations, the payload key (162) may be an advanced encryption standard (AES) 256 key that is 256 bits long. In some implementations, the payload salt (160) is a randomly generated eight-byte value. In some implementations, the payload salt (160) is applied to the payload (152) by appending the payload salt (160) to the payload (152).

The data packs (154) (which may also be referred to as a micro database, owner database, or a combination thereof) may include a subset of information of the macro database (e.g., macro database 180 of FIG. 1) that pertains to recent access to the encrypted file(s) (150), file access policies associated with the encrypted file(s) (150), and owner information associated with the encrypted file. The data packs (154) may include access log information (e.g., in access log (172)) that that identifies prior last user(s) to access the encrypted file(s) (150) and the prior access device(s) to access the encrypted file(s) (150). For example, the data pack may include the access log (172) that includes fingerprints associated with users and devices that previously accessed the encrypted file(s) (150). User fingerprint information may include an email address, an access token, a hash value, etc. Access device fingerprint information may include a hardware and/or software identifier. In some examples, the finger information for the access log (172) may include network information, geographical location information, access client information, etc. In some cases, the access log (172) includes hardware information that uniquely identifies a hardware component executing the access client. As an example, the hardware information may be a user thumbprint that is a universally unique identifier (UUID) from the computing system of the user. As another example, the user thumbprint may be a motherboard serial number. The access information of the access log (172) may include an access timestamp. The access timestamp may identify the date and time of the last successful access to the encrypted file(s) (150).

Additionally, the data packs (154) may include indications of access rights (e.g., file access policies (170)) for the encrypted file(s) (150) and entity or ownership information (also referred to as an owner database) for the encrypted file(s) (150). The file access policies (170) may indicate full access, collaborative access, read only access and may be specified on a global basis, a per group basis, a per user basis, etc. The file access policies may also include digital rights management information, which may be a subset of file access policies that includes data that identifies the privileges and access rights of users for the encrypted file(s) (150). The digital rights management information may be configured on a global basis, per group basis, per user basis, etc. The access rights may also include display constraints that restrict or allow access to the file using various programs, such as a restricting or allowance of sharing the payload in a video conference program.

The access policies (170) may also include data loss prevention information that includes information and instructions that may identify and remove or obfuscate sensitive information from the payload (152) of the encrypted file(s) (150). The data loss prevention information may be examples of display constraints, as described herein. The sensitive information they include personally identifying information. The sensitive information may be removed or obfuscated before the payload (152) is viewed with or saved to an access device acting as a decryptor device.

The file access policies (170) may also force geographical location restrictions. For example, a file access policy may indicate that the file is accessible only at an office location, a geographical location (e.g., within a state or country), or the like. Thus, when the policy is being enforced, the access client may use network information, GPS information, or other information that may be used to identify a geographical location, in order to determine that access is authorized. If such information is unavailable, access to the payload (152) may be restricted. Thus, the file access policies (170) may include various forms, including bits that indicate types of access rights, indications of rules or instructions enforcing data loss preventions, indications of geographical restrictions, and the like. In some cases, the file access policies (170) may restrict a user from using a virtual private network (VPN) to access the files. Thus, if a VPN is detected, then an access request may be rejected, or the user may be restricted from viewing the file.

The ownership information (174) may include a value for an Author ID field uniquely identifies the user that created the encrypted file(s) (150). The value for the Author ID may be an email address, an employee identifier, a username, etc. The ownership information (174) may include an entity signature, such as a digital signature. A user of the system may be one of multiple employees of the entity. Each encrypted file generated by users for the entity may include the same entity signature, which identifies the entity as the source of the encrypted file, or multiple entity signatures, which may identify the entity source of the encrypted file and the user that generated the encrypted file.

The ownership information (174) may also include entity database information that includes an indication of one or more application programming interface (API) endpoints (e.g., uniform resource locators (URLs) that the access client is used to verify that a user has access to the encrypted file. For example, the one or more API endpoints indicated may be a Verify API and a Transfer API. The Verify API may be accessed to verify that a user (having the same entity as the encrypted file(s) (150)) may access the encrypted file(s) (150). The Transfer API may be accessed to verify that a user (having different entity as the encrypted file(s) (150)) may access the encrypted file(s) (150). As the API endpoints may be access before decryption of the encrypted file(s) (150), the API endpoints may be located outside any encryption wrapper (e.g., may not be encrypted by one of the keys). For example, indications of the API endpoints may be included in metadata (156).

The metadata (156) is a store of information about the encrypted file(s) (150). As an example, the metadata (156) may identify the type of file in the payload (152), the name of the file in the payload (152), the length of the file in the payload (152), the encryption algorithms for the payload (152) (including the salting algorithm), the encryption algorithms for the data packs (154), the encryption algorithms for the encrypted file(s) (150), etc. As described herein, the metadata (156) may also include indications of the API endpoints. Various aspects of the metadata (156) may or may not be encrypted as part of the encrypted file(s) (150). In some cases, aspects of the metadata (156) may be included in an access request (encryption or decryption request) to the server.

The data packs (154) may be encrypted with one or more data pack keys (164) prior to being inserted into the encrypted file(s) (150). In some implementations, the one or more data pack keys (164) may be an advanced encryption standard (AES) 128 keys. The one or more data pack keys (164) may be shorter than the payload key (162) to reduce the time needed to access the data in the data packs (154).

The encrypted file(s) (150) may be salted with the file salt (166) and encrypted with the file key (168). In some implementations, the file key (168) may be an advanced encryption standard (AES) 256 key. In some implementations, the file salt (166) is a randomly generated eight-byte value. The file salt (166) may be applied to the contents of the encrypted file(s) (150) (e.g., the payload (152) after being salted with the payload salt (160) and encrypted with the payload key (162), the data packs (154) after being encrypted with the data pack keys (164)) by appending the file salt (166) to the encrypted file(s) (150).

In some implementations, a salt (e.g., the file salt (166)) is created by generating a first random 8-digit number between 10000000 to 99999999 stored in Y. A second random number between 1 and 8 is then generated and stored in X. The Xth digit in Y is then replaced with the value of X. The steps of generating the second random number and replacing a value in Y are repeated four times. The value after the last replacement is the salt. Different algorithms may be used to generate the salts used by the system.

Various information included in the data packs (154), in conjunction with the server communications, supports the dynamic, self-intelligent, and self-protecting data security schemes described herein. When an access client receives an access package (e.g., executables and access keys) from the server, the access client executes the executable code of the access package to decrypt the contents of the encrypted file using various keys. The access client is configured to enforce the access policies (170) that are included in the encrypted file. Further, upon decryption, the executable code of the access package may cause the access log (172) to be updated with the information about the access client (e.g., client identifier, version, fingerprint), device executing the access client (e.g., device identifier, motherboard identifier, hardware identifier), user information, and other information as described herein. As such, if the encrypted file(s) (150) is passed to another user or device, and the user attempts to open the encrypted file(s) (150), the contents of the access log (172) may be used to identify the chain of custody of the encrypted file(s) (150) to see who and/or which device compromised the encrypted file(s) (150).\

Aspects of FIG. 1B are described with respect to the payload (152) being a file. It should be understood that the techniques described herein may be applicable to portions of a file or objects within a file. For example, a file may include multiple elements (e.g., OLE elements), images, charts, etc. that are embedded within a file. In such cases, the payload (152) may be an example of one particular element within a file or a portion of the file (e.g., particular pages). Thus, the element or page (e.g., payload (152)) may be encrypted and the access policies (170) may be enforced for the element or page. Similarly, the access log (172) and ownership information (174) may be based on the element or page within the file that is secured.

Figure 2B:
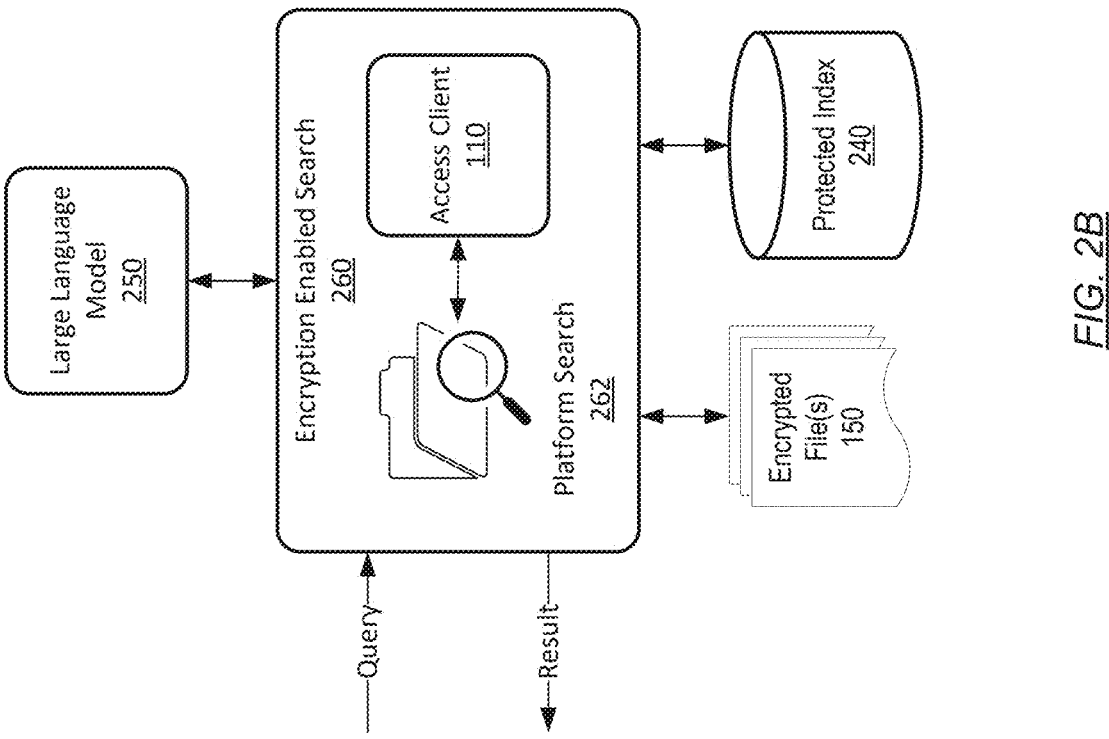
FIGS. 2A and 2B show a computing architecture that supports encrypted file storage and search in accordance with illustrative embodiments.
Figure 2A:
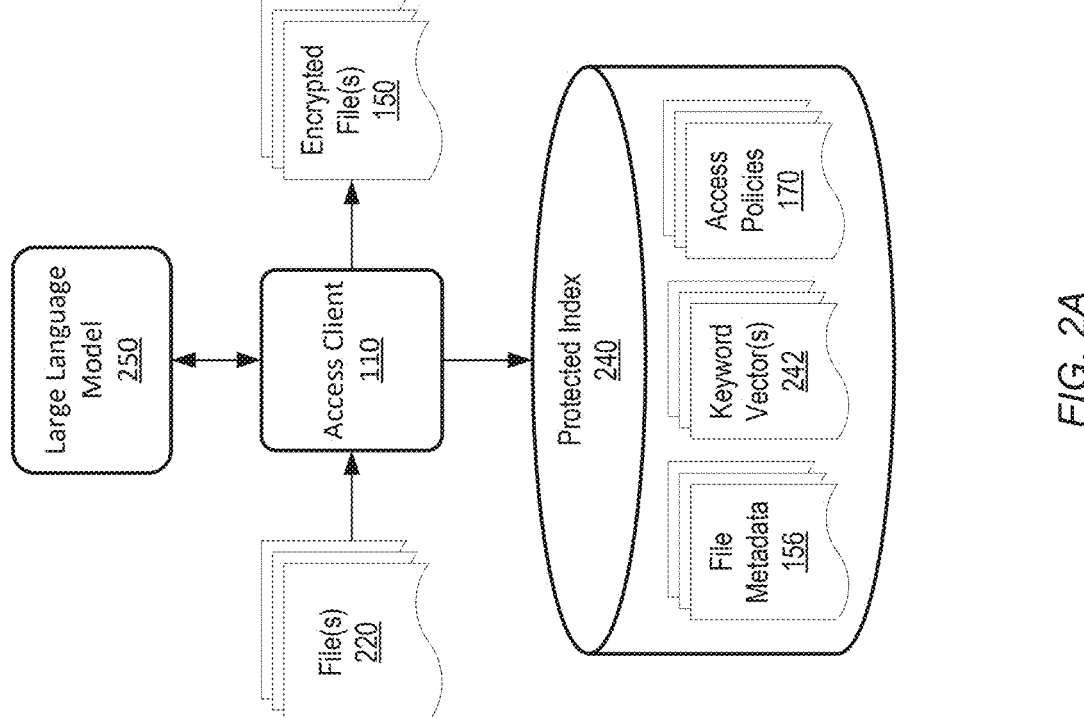

FIGS. 2A and 2B show a computing architecture (100) that supports encrypted file storage and search in accordance with illustrative embodiments. The computing architecture (200) includes an access client (110), protected index (240), and large language model (250).

File(s) 220 are digital files that contain the content to be processed. These files may contain a variety of data types, including but not limited to text, images, videos, and audio. The file(s) 220 may adhere to numerous file formats and protocols, such as PDF, DOCX, PNG, MP4, or MP3, depending on their content. The file(s) 220 may be sourced from user inputs, storage devices, or network transfers and are presented to the system for processing.

The Access Control (210) is responsible for managing permissions and overseeing the encryption process. Access Control (210) includes software components that enforce security protocols, govern access to files, and handle encryption requests. Access Control (210) may utilize cryptographic libraries such as OpenSSL or the cryptography library in Python to implement encryption algorithms (e.g., AES, RSA). Access control mechanisms might involve authentication services like OAuth or LDAP for verifying user credentials before file encryption is permitted. This module interacts with an access server (e.g., access server (120) of FIG. 1) to request access packages, which include executable code and access keys necessary for encrypting the file(s).

The Large Language Model (LLM) (250) is an artificial intelligence system capable of understanding and processing natural language. The large language model could be implemented using machine learning frameworks and libraries such as TensorFlow, PyTorch, or GPT (Generative Pretrained Transformer) libraries. The large language model's computation may be supported by specialized hardware optimized for machine learning tasks, such as GPUs or TPUs.

The LLM (250) analyzes the content of the file(s) (220) and extract keywords. LLM (250) processes the text within the files, identifies significant keywords, and generates keyword vector(s) (242) that capture the semantic and contextual meanings of those keywords in the context of the file(s) (220) for indexing purposes.

If file(s) 220 are from a specialized domain (e.g., legal, or medical), the LLM (250) may be further fine-tuned on domain-specific texts to better understand and extract relevant keywords. Further tuning of the LLM (250) may promote keyword vector(s) that more accurately represent terms within that particular field.

The LLM (250) may use word embeddings to convert text data into a high-dimensional vector form, where words with similar meanings have a similar representation. The model projects the keywords into a vector space where the position of each word vector is determined by its linguistic context.

By converting keywords of the file(s) (220) into keyword vector(s) (242), the LLM (250) provides a numerical fingerprint for the content of the file(s) (220). access client (110) uses these fingerprints (i.e., keyword vector(s) (242)) to index and retrieve the encrypted file(s) (150) based on semantic search queries, enabling users to find files that are contextually related to their search terms.

Encrypted file(s) (150) are the output of the encryption process applied to the original file(s) (220). In other words, encrypted files (230) are the transformed version of the original data, made unreadable to unauthorized parties without the corresponding decryption keys. The storage format of the encrypted files could be in a binary or other encrypted format that maintains the confidentiality of the data until appropriate decryption keys are provided by the "access client" 110.

The encryption process may be performed as described in relation to FIG. 1A and FIG. 1B above, using cryptographic algorithms and standards, such as Advanced Encryption Standard (AES) for strong symmetric-key encryption. This process may be supported by secure hardware modules like Hardware Security Modules (HSMs) to safeguard the encryption keys and the cryptographic operations themselves.

The Protected Index (240) is a secure storage structure designed to catalog the encrypted files and their associated data. The Protected Index (240) could be built using database management systems that support encryption, like Microsoft SQL Server with Transparent Data Encryption (TDE) or Oracle Database with its Advanced Security Option.

The Protected Index (240) includes file metadata (156), access policies (170), and keyword vector(s) (242). The indexing process may involve algorithms that map keywords and metadata to the corresponding encrypted files, and may utilize inverted index structures to facilitate fast search operations.

In one or more embodiments of the invention, the Protected Index (240) is stored in a data repository. The data repository is any type of storage unit and/or device (e.g., a file system, database, data structure, or any other storage mechanism) for storing data. Further, the data repository may include multiple different, potentially heterogeneous, storage units and/or devices.

FIG. 2B shows a computing architecture (100) that supports encrypted file storage in accordance with illustrative embodiments. The computing architecture (100) includes an access client (110), protected index (240), and large language model (250) period.

platform search (262) represents the system's user interface component where queries are input, and results are displayed. platform search (262) could be integrated into operating systems like Windows, macOS, or Linux, or could be part of a web-based platform. platform search (262) searches filenames, tags and keywords associated with the file, normally stored as the metadata of the file. platform search (262) may allow the user to search for words in the content of the file but are limited to some file types like documents and text files. However, Platform searches cannot search for content or keywords associated encrypted files and any information regarding the associated access policies.

encryption enabled search (260) integrates with an existing platform's search infrastructure to enhance its capability to search through encrypted data. encryption enabled search (260) interfaces with platform-native search services, such as Windows Search, extending the search functionality to recognize and manage encrypted file formats. encryption enabled search (260) may utilize APIs provided by the underlying operating system to register custom search handlers or filters, implementing filters or hooks that intercept search operations and apply additional logic to process encrypted file types.

encryption enabled search (260) uses the LLM (250) to analyze queries submitted for searching encrypted files. LLM (250) interprets the semantics of the search query and may generate appropriate query vectors that can be used by the access client (110) to search the protected index 240.

Here, the access client (110) serves as the gateway for secure access to the encrypted files. The access client (110) is responsible for authenticating search requests, fetching decryption keys from a secure key management service, and enabling the processing and filtering through encrypted content. access client (110) providing the necessary decryption keys and access control mechanisms to ensure that search operations on encrypted files are executed securely and in compliance with predefined access policies.

The encryption enabled search (260) allows the system to parse queries against encrypted content, leveraging metadata, tags, and keywords, while adhering to the security constraints defined by the access control framework.

The encryption enabled search (260) applies all the policies associated with the data before presenting data to an end user in the search result. For example, encryption enabled search (260) may include policy filters like geolocation and time embargo, as well as other filters, which can be used independently, or in conjunction with content search.

While FIGS. 1 and 2 show a configuration of components, other configurations may be used without departing from the scope of the invention. For example, various components may be combined to create a single component. As another example, the functionality performed by a single component may be performed by two or more components.

Figure 3:
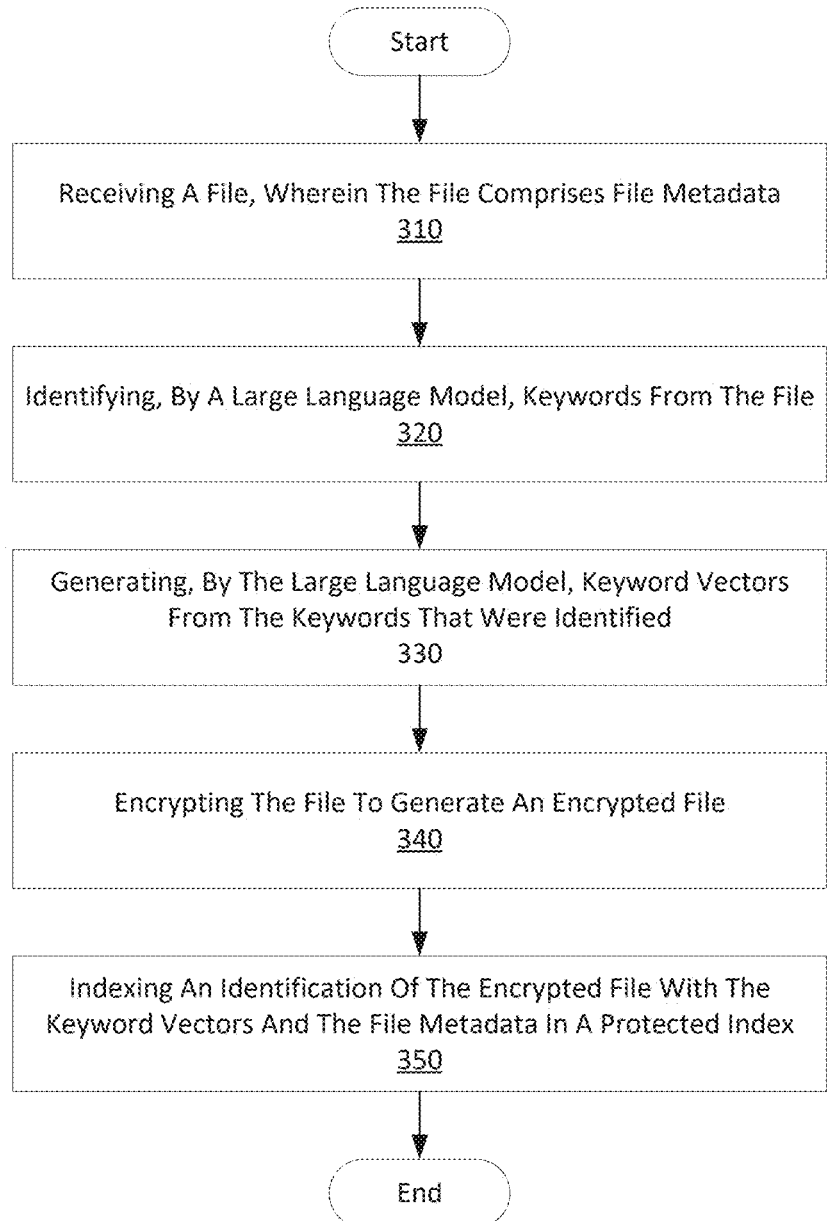
FIG. 3 shows a flow chart of a method for searching encrypted files in accordance with illustrative embodiments.

Referring now to FIG. 3, a flow chart of a method for searching encrypted files is shown in accordance with illustrative embodiments. The method of FIG. 3 can be performed using one or more of the components illustrated in FIGS. 1 and 2, including access client (110) and encryption enabled search (260).

At Step 310, a file is received, wherein the file comprises file metadata. This step involves the system receiving a digital file (e.g., file(s) (220) of FIG. 2A) that includes associated file metadata (e.g., file metadata (156) of FIG. 2A). The file could be in any format, such as PDF, DOCX, MP3, or MP4, and the metadata might include details such as the file's creation date, author, size, and type. The metadata provides context about the file that may be useful during later stages of processing and indexing.

File handling libraries like Apache Commons IO for Java or Python's built-in 'open ( )' function may be employed for reading files. The metadata may be extracted using parsers appropriate to the file type, such as ExifTool for images or PyPDF2 for PDFs.

At Step 320, a large language model identifies keywords from the file. The model reads the textual content of the file, processes the information contextually, and extracts significant terms that represent the essence or primary themes of the document. This process might involve natural language processing (NLP) techniques such as tokenization, stemming, and lemmatization, which help in refining the keyword extraction process. The language model could be hosted on a high-performance computing system with GPUs to manage the computational load.

At Step 330, the large language model generates keyword vector(s) from the keywords that were identified. Generating the keyword vector(s) may involve transforming the keywords into a vector space where each vector represents a keyword in a multidimensional space. The dimensions of this space capture various semantic properties of the words. Techniques like word embedding (using pre-trained models on platforms like TensorFlow or PyTorch) are employed to convert keywords into numerical formats that reflect their meanings and contextual relationships with other words.

At Step 340, the file is encrypted to generate an encrypted file. The encrypted file may be encrypted file(s) (150) of FIG. 1B.

Encryption of the original file to ensure its confidentiality and security. The encryption might be performed According to the process illustrated in FIGS. 1A and 1B. For example, using symmetric key algorithms like AES (Advanced Encryption Standard), which provides a balance of security and performance. This process may be managed by an encryption library or module, which also manages the encryption keys securely, such as access server (120) and key server (140) of FIG. 1.

In some embodiments, the encryption process may include initiating an access request to an access server. The access request may include access information and file information. The system receives an access package from the access server, which includes executable code and one or more access keys. The access package may include a data pack, which contains file access policies encrypted along with the file. The executable code is used to encrypt the file with the provided access keys. The access package is removed from memory to maintain security.

At Step 350, an identification of the encrypted file is indexed with the keyword vector(s) and the file metadata in a protected index.

The encrypted file is indexed using the keyword vector(s) and file metadata generated and gathered in the previous steps. The indexing process may use a database management system that supports encrypted data, ensuring that the index itself does not compromise the security of the data it references.

Figure 4:
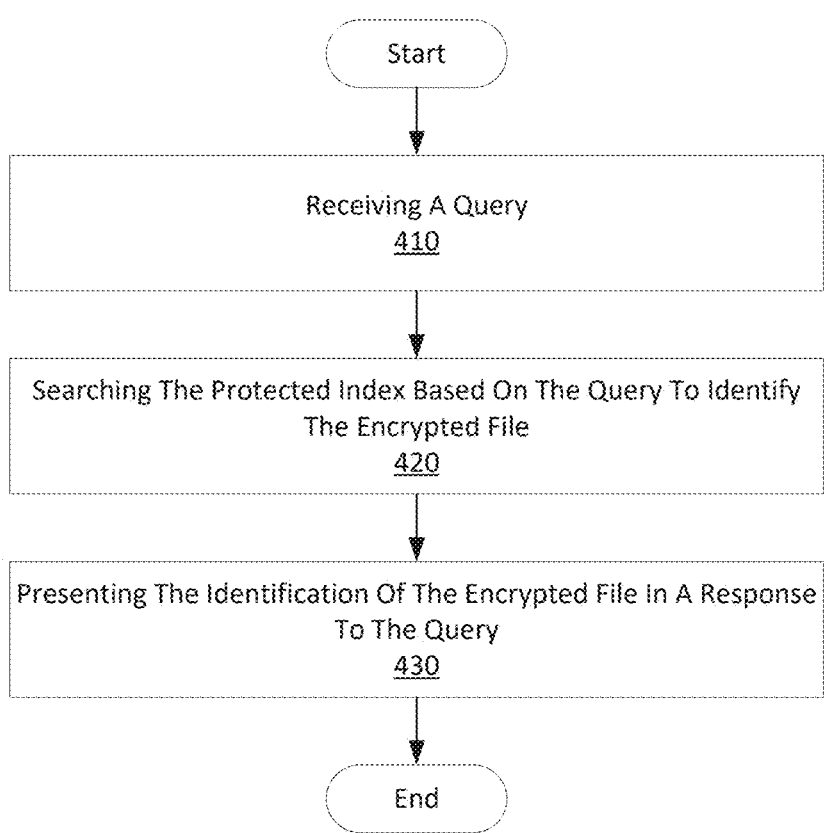
FIG. 4 shows a flow chart of a method for query handling and file identification in accordance with illustrative embodiments.

Referring now to FIG. 4, a flow chart of a method for query handling and file identification is shown in accordance with illustrative embodiments. The method of FIG. 3 can be performed using one or more of the components illustrated in FIGS. 1 and 2, including access client (110) and encryption enabled search (260).

At Step 410, a query is received. The query may consist of keywords or phrases that a user inputs to a user interface component, such as a web form or a search bar within an application interface, which captures user input. This interface could be part of the platform search (262) of FIG. 2B. The query may then be processed using back-end web server technologies such as Apache or Nginx and server-side scripts in languages like Python or Java.

At Step 420, the protected index is searched based on the query to identify the encrypted file. The query is processed to identify relevant encrypted files in the protected index (240) of FIG. 2. Query processing may be performed using the encryption enabled search (260) of FIG. 2B, utilizing algorithms to match the query against metadata and keyword vector(s) associated with encrypted files in the protected index. The search operation might leverage full-text search technologies such as Elasticsearch or Apache Solr, to facilitate quick retrieval of information based on the keyword vector(s) generated by the LLM (250) from the encrypted content. The search results identify encrypted files whose indexed data match the query parameters.

At Step 430, the identification of the encrypted file is presented in a response to the query. This step ensures that while users can identify and select relevant encrypted files based on their search, the actual content remains secure until proper decryption procedures are initiated.

The identifiers or metadata of the encrypted files that match the search criteria is displayed, without revealing sensitive content within the files. The presentation may utilize web technologies such as HTML, CSS, and JavaScript to format the response. Generation of the response may be performed by platform search (262) of FIG. 2B.

Upon selection of an encrypted file, the system sends an access request to decrypt the file. The system receives and executes the decryption executable, decrypts the file using the provided keys, and subsequently removes the access package from memory.

In some embodiments, file decryption may utilize access policy management and authorization. For example, access policies associated with the encrypted file in the protected index are identified. The system attempts to authorize the access request in accordance with the identified access policies. If authorization is successful, the access request is transmitted to the access server to proceed with decryption or other permitted actions.

While the various steps in the flowcharts of FIG. 3 and FIG. 4 are presented and described sequentially, at least some of the steps may be executed in different orders, may be combined, or omitted, and at least some of the steps may be executed in parallel. Furthermore, the steps may be performed actively or passively.

Figures 5A, 5B:
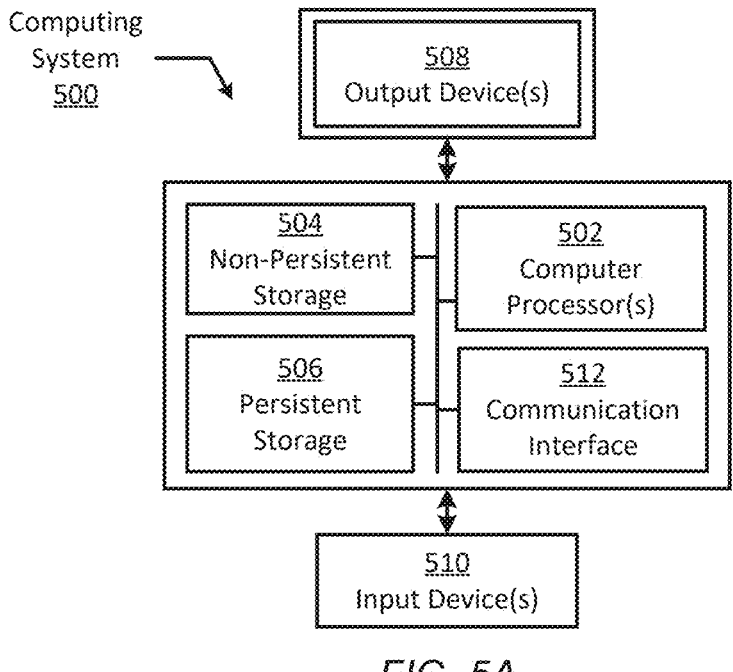
FIGS. 5A and 5B show a computing system in accordance with illustrative embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processor(s) (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the invention.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and." Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   receiving a file, wherein the file comprises file metadata;
   identifying, by a large language model, keywords from the file;
   generating, by the large language model, keyword vector(s) from the keywords that were identified, wherein the keyword vector(s) comprise word-embedding vectors in a high-dimensional vector space that represent semantic meaning of the keywords;
   encrypting the file to generate an encrypted file; and
   indexing an identification of the encrypted file with the keyword vector(s), the file metadata, and one or more access policies associated with the encrypted file in a protected index.

2. The method of claim 1, wherein generating the encrypted file further comprises:
   transmitting an access request to an access server, wherein the access request includes access information and file information for the file;
   receiving, from the access server, an access package that includes executable code and one or more access keys;
   executing the executable code to encrypt the file using the one or more access keys; and
   removing the access package from memory.

3. The method of claim 2, wherein receiving the access package comprises:
   receiving the access package that includes a data pack comprising an indication of one or more file access policies associated with the file, wherein the data pack is encrypted with the file using the one or more access keys.

4. The method of claim 1, further comprising:
   receiving a query;

searching the protected index based on the query to identify the encrypted file; and presenting the identification of the encrypted file in a response to the query.

5. The method of claim 4, wherein searching the protected index further comprising:

generating, by the large language model, a query vector from the query; and searching the protected index based on the query vector to identify the encrypted file.

6. The method of claim 4, wherein searching the protected index further comprises:

applying a search filter that is hooked into a platform search.

7. The method of claim 4, further comprising:

in response to receiving a selection of the encrypted file:

transmitting an access request to an access server, wherein the access request includes access information and file information for the file;

receiving, from the access server, an access package that includes executable code and one or more access keys;

executing the executable code to decrypt the file using the one or more access keys; and removing the access package from memory.

8. The method of claim 4, wherein presenting the identification of the encrypted file further comprises:

identifying access policies associated with the encrypted file in the protected index; and attempting to authorize an access request according to the access policies; and transmitting the access request to an access server based on successfully authorizing the access request.

9. A method comprising:

receiving a query;

generating, by a large language model, a query vector from the query, wherein the query vector comprises a word-embedding vector in a high-dimensional vector space;

searching a protected index based on the query to identify an encrypted file, wherein searching the protected index comprises applying a search filter that is hooked into a platform search; and presenting the identification of the encrypted file in a response to the query, wherein presenting comprises enforcing one or more access policies associated with the encrypted file prior to presenting the identification.

10. The method of claim 9, wherein searching the protected index further comprising:

comparing the query vector to keyword vector(s) indexed in the protected index based on semantic similarity to identify the encrypted file.

11. The method of claim 9, wherein applying the search filter that is hooked into the platform search further comprises:

registering one or more search handlers or filters with a platform search service to intercept search operations and apply logic for encrypted file types.

12. The method of claim 9, further comprising:

in response to receiving a selection of the encrypted file:

transmitting an access request to an access server, wherein the access request includes access information and file information for the file;

receiving, from the access server, an access package that includes executable code and one or more access keys;

executing the executable code to decrypt the file using the one or more access keys; and removing the access package from memory.

13. The method of claim 9, wherein presenting the identification of the encrypted file further comprises:

identifying access policies associated with the encrypted file in the protected index;

attempting to authorize an access request according to the access policies; and transmitting the access request to an access server based on successfully authorizing the access request.

14. A computer program product comprising:

computer readable program code stored on a non-transitory computer readable storage medium that, when executed by a processor, perform the method of:

receiving a file, wherein the file comprises file metadata;

identifying, by a large language model, keywords from the file;

generating, by the large language model, keyword vector(s) from the keywords that were identified, wherein the keyword vector(s) comprise word-embedding vectors in a high-dimensional vector space that represent semantic meaning of the keywords;

encrypting the file to generate an encrypted file; and indexing an identification of the encrypted file with the keyword vector(s), the file metadata and one or more access policies associated with the encrypted file in a protected index.

15. The computer program product of claim 14, wherein generating the encrypted file further comprises:

transmitting an access request to an access server, wherein the access request includes access information and file information for the file;

receiving, from the access server, an access package that includes executable code and one or more access keys;

executing the executable code to encrypt the file using the one or more access keys; and removing the access package from memory.

16. The computer program product of claim 15, wherein receiving the access package comprises:

receiving the access package that includes a data pack comprising an indication of one or more access policies associated with the file, wherein the data pack is encrypted with the file using the one or more access keys.

17. The computer program product of claim 14, further comprising:

receiving a query;

searching the protected index based on the query to identify the encrypted file; and presenting the identification of the encrypted file in a response to the query.

18. The computer program product of claim 17, wherein searching the protected index further comprising:

generating, by the large language model, a query vector from the query; and searching the protected index based on the query vector to identify the encrypted file.

19. The computer program product of claim 17, further comprising:

in response to receiving a selection of the encrypted file:

identifying access policies associated with the encrypted file in the protected index; and attempting to authorize an access request according to the access policies;

transmitting an access request to an access server based on successfully authorizing the access request, wherein the access request includes access information and file information for the file;

receiving, from the access server, an access package that includes executable code and one or more access keys;

executing the executable code to decrypt the file using the one or more access keys; and removing the access package from memory.

20. A computer system comprising:

a processor;

memory; and instructions stored in the memory and executable by the processor for:

receiving a file, wherein the file comprises file metadata;

identifying, by a large language model, keywords from the file;

generating, by the large language model, keyword vector(s) from the keywords that were identified, wherein the keyword vector(s) comprise word-embedding vectors in a high-dimensional vector space that represent semantic meaning of the keywords;

generating an encrypted file from the file;

indexing an identification of the encrypted file with the keyword vector(s), the file metadata, and one or more access policies associated with the encrypted file in a protected index;

receiving a query;

generating, by the large language model, a query vector from the query, wherein the query vector comprises a word-embedding vector in a high-dimensional vector space;

searching the protected index based on the query to identify the encrypted file, wherein searching comprises applying a search filter hooked into a platform search; and presenting the identification of the encrypted file in a response to the query, wherein presenting comprises enforcing the one or more access policies prior to presenting the identification.

* * * * *